United States Patent Office 3,418,379
Patented Dec. 24, 1968

3,418,379
ALKYLATION PROCESS
Edward S. Parsey and Theodore E. Majewski, Midland, Mich., assignors to The Dow Chemical Company, Midland, Mich., a corporation of Delaware
No Drawing. Filed Feb. 12, 1965, Ser. No. 432,417
11 Claims. (Cl. 260—624)

This invention relates to a method of alkylating phenol. More particularly, this invention relates to a process for producing ortho-alkylphenol compounds.

Several catalytic methods for the production of ortho-alkylphenols are known. For example, British Patent 925,819 discloses the use of gamma-aluminum oxide as a catalyst for the ortho-alkylation of phenol. Similarly, U.S. Patent 2,831,898 by Ecke et al. discloses a phenol alkylation process which employs aluminum phenoxide as the catalyst. Both of these systems have certain disadvantages, however, The process of British Patent 925,819 requires the gamma form of aluminum oxide because other forms of aluminum oxide do not give the desired catalytic effects. When aluminum phenoxide is used as a catalyst for the ortho-alkylation of phenol, the catalyst is destroyed by hydrolysis after the alkylation reaction is completed.

It has now been found that the alkylation of phenol may be carried out by contacting a mixture containing phenol and an unsaturated hydrocarbon in the presence of a catalytic amount of an indium or gallium metal oxide.

The gallium or indium metal oxide used as a catalyst in the present invention is preferably gallium sesquioxide ($Ga_2O_3$) or indium sesquioxide ($In_2O_3$). Any compound which may be converted to gallium sesquioxide or indium sesquioxide under the conditions of the alkylation reaction may also be used. For example, gallous oxide ($Ga_2O$) may be used, since $Ga_2O_3$ is formed by the spontaneous decomposition of $Ga_2O$. Only a catalytic amount of the indium or gallium oxide is required. Generally, from 0.50 to 20.0 percent by weight of the metal oxide (based upon the weight of the phenol reactant) is sufficient. Mixtures of gallium and indium oxides may be employed. For example, equimolar amounts of $Ga_2O_3$ and $In_2O_3$ may be employed as the mixed catalyst. The catalysts used in the alkylation process of the invention did not show degradation or decrease in activity during the alkylation reactions.

In a specific embodiment of the process of the invention, at least stoichiometric amounts of phenol and an unsaturated hydrocarbon (preferably an olefin) are contacted in the presence of an indium or gallium metal compound catalyst (such as a gallium oxide or an indium oxide) at a temperature of from about 300° to 400° C. under a pressure of from about 1 to 200 atmospheres. Gallium sesquioxide is the preferred catalyst for the preparation of o-alkylphenols since $Ga_2O_3$ is more selective than $In_2O_3$ for this purpose. In addition, $In_2O_3$ is highly toxic and requires additional handling precautions during process manipulations. Pressures of from 500 p.s.i.g. to 2000 p.s.i.g. are very suitable when $Ga_2O_3$ is used as a catalyst at temperatures of from 325° to 385° C. The alkylation reaction may be carried out batchwise, or continuously under autogenous pressure. In a typical batch process, about thirty to forty percent (by weight) of the phenol is alkylated in the presence of $Ga_2O_3$ in less than three hours using equimolar amounts of phenol and olefin at a temperature of from about 325° to 385° C. under a pressure of from 20 to 200 atmospheres. In a continuous process, the unreacted phenol and olefin may be continuously recycled to the reactor at any convenient rate while the alkylated phenol products synthesized during the reaction are removed. The pressure may be varied or held constant in the continuous process.

Any olefin may be employed in the alkylation reaction. Examples of unsaturated hydrocarbons which may be used in the reaction include ethylene, 1-propene, 1-butene, isobutylene, 3-hexene, 3-heptene, 1-nonene, diisobutylene, 1-octene, 1-decene, 1-pentene, 2-pentene, cyclopentene, cyclohexene and cycloheptene. Alpha-olefins with up to 10 carbon atoms are preferred reactants for the preparation of alkylated phenols in which the alkyl group is in the ortho position with respect to the hydroxyl group. Typical examples of alkylations which produce substantial amounts of o-alkylphenol include the following reactions in which either $Ga_2O_3$ or $In_2O_3$ is employed as the catalyst at temperatures of from 325° to 385° C.

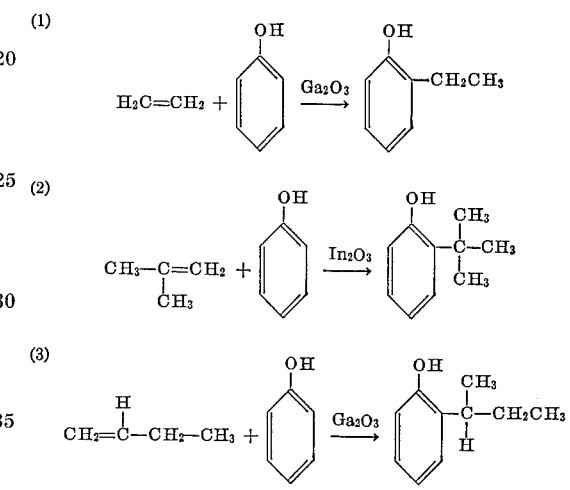

When these reactions are carried out at temperatures of from 325° to 385° C., from 40 to 75 percent by weight of the phenol reacts. The weight ratio of ortho-alkylphenol to para-alkylphenol produced in the reaction at temperatures of from 325° to 385° C. ranges from about 3:1 to 50:1. At lower temperatures (300°–325° C.), less phenol is alkylated, but the weight ratio of ortho isomer to para isomer is greater than the ratio obtained at temperatures above 375° C. (i.e., 375° to 400° C.). For example, at 300° C. (using a mixture of equimolar amounts of phenol and 1-butene), approximately 18 percent by weight of the phenol is converted to a mixture of o- and p-sec.-butylphenol in which the weight ratio of the ortho-sec.-butylphenol to the para isomer is approximately 18:1. At 400° C., about 55 percent by weight of the phenol is alkylated, but the weight ratio of ortho-sec.-butylphenol to para-sec.-butylphenol is about 1:1.

The following examples are submitted for the purpose of illustration only and are not to be construed as limiting the scope of the invention in any way.

Example I

A mixture of one mole (94.1 grams) of phenol, one mole (56 grams) of 1-butene and 9.4 grams (0.05 mole) of gallium sesquioxide ($Ga_2O_3$) was placed in a stainless steel reactor and sealed. The reactor was heated at 350° C. for three hours, cooled and the resulting reaction mixture filtered to remove the $Ga_2O_3$ catalyst. The conversion of phenol to butylphenols was approximately 54.7 percent (based upon the total weight of phenol charged to the reactor). The composition of butylphenols separated from the reaction mixture was as follows (percent by weight based upon the total weight of the alkylated phenols produced in the reaction):

| Compound: | Percent by wt. |
|---|---|
| Ortho-sec.-butylphenol | 66.0 |
| Para-sec.-butylphenol | 7.5 |
| Di-2,6-sec.-butylphenol | 14.4 |
| Di-2,4-sec.-butylphenol | 6.8 |
| Residue (other alkylated phenols) | 5.3 |
| Total | 100.0 |

The total weight of the alkylated phenols separated from the reaction mixture was 68.3 grams. The total amount of the reaction mixture separated from the reactor was 123.0 grams.

Similar product distributions are obtained when phenol is alkylated with diisobutylene, 1-octene, ethylene and 1-propene.

Examples II–VI

In order to test the effect of temperature on the alkylation reaction, the procedure of Example I was repeated using identical amounts of catalyst and reactant at different temperatures. In each example, a mixture of 1 mole of phenol, 1 mole of 1-butene and 9.4 grams of gallium sesquioxide was heated at a given temperature for a three hour period and the amounts of ortho- and para-sec.-butylphenol determined. The results are summarized in Table 1. The percent conversion represents the amount (in weight percent) of phenol which was reacted. The actual amounts in grams of the ortho- and para-sec.-butylphenol which were recovered are recorded in Table 1. All reactions were carried out under autogenous pressure (up to about 1700 p.s.i.g.).

TABLE 1

| Example Number | Temp. (°C.) | Percent conversion of phenol | Grams ortho-sec.-butylphenol | Grams para-sec.-butylphenol |
|---|---|---|---|---|
| II | 350 | 46.3 | 50.0 | 3.7 |
| III | 300 | 22.6 | 17.6 | .78 |
| IV | 400 | 38.6 | 24.1 | 20.6 |
| V | 375 | 39.8 | 53.2 | 6.9 |
| VI | 325 | 26.2 | 24.3 | 1.1 |

The $Ga_2O_3$ catalyst showed no reduction in activity after approximately thirty hours of reaction time.

Example VII

In a manner similar to the method described in the preceding examples, a mixture of one mole of phenol, one mole of 1-butene and 13.9 grams (0.05 mole) of indium sesquioxide ($In_2O_3$) was heated in a sealed reactor at 350° C. for a three hour period. Based on the amount of phenol charged to the reactor, the conversion was 22.3 percent. The following amounts of alkylated phenols were recovered from the filtered reaction mixture:

| Product: | Grams |
|---|---|
| Ortho-sec.-butylphenol | 27.3 |
| Para-sec.-butylphenol | 5.3 |

Example VIII

In a manner similar to the method described in the preceding examples, a mixture of 94.1 grams (1 mole) of phenol, 82.1 grams (1 mole) of cyclohexene and 9.4 grams (0.05 mole) of $Ga_2O_3$ was heated in a sealed reactor at 350° C. for a three hour period. Based on the amount of phenol charged to the reactor, the conversion was 55.6 percent. The crude product weighed 159.4 grams and contained 28.3 percent by weight of o-cyclohexylphenol. Vapor phase chromatographic analysis showed no para-cyclohexylphenol.

We claim as our invention:

1. A method of manufacturing an alkylphenol which comprises heating phenol and an olefinic hydrocarbon in the presence of a catalytic amount of an oxide of a metal with an atomic number of $(31+18n)$ wherein $n$ is an integer of from 0 to 1.

2. A method of manufacturing an alkylphenol which comprises reacting phenol and a mono-olefin of from 2 to 10 carbon atoms in the presence of a catalytic amount of a gallium oxide compound at a temperature of from 300° to 400° C.

3. The method of claim 2 wherein the gallium oxide compound is $Ga_2O_3$.

4. A method of manufacturing an alkylphenol which comprises reacting phenol and a mono-olefin of from 2 to 10 carbon atoms in the presence of a catalytic amount of an indium oxide compound at a temperature of from 300° to 400° C.

5. The method of claim 4 wherein the indium oxide compound is $In_2O_3$.

6. A method of preparing a mixture of alkylphenols containing at least fifty percent by weight (based upon the total weight of the ortho- and para-alkylphenols in the mixture) of ortho-alkylphenol which comprises reacting phenol and an alpha-olefin of no more than 10 carbon atoms in the presence of a catalytic amount of $Ga_2O_3$ at a temperature of from 325° to 385° C.

7. The method of claim 6 wherein the alpha-olefin is 1-butene.

8. A method of preparing a mixture of alkylphenols containing at least fifty percent by weight (based upon the total weight of the ortho- and para-alkylphenols in the mixture) of ortho-alkylphenol which comprises reacting phenol and an alpha-olefin of no more than 10 carbon atoms in the presence of a catalytic amount of $In_2O_3$ at a temperature of from 325° to 385° C.

9. The method of claim 8 wherein the alpha-olefin is 1-butene.

10. A method of preparing ortho-sec.-butylphenol which comprises reacting equimolar amounts of phenol and 1-butene in the presence of $Ga_2O_3$ catalyst at a temperature of from 325° to 385° C. under a pressure of from 500 p.s.i.g. to 2000 p.s.i.g. and separating ortho-sec.-butylphenol from the reaction mixture.

11. A method of preparing ortho-sec-butyl-phenol which comprises reacting phenol and 1-butene in the presence of a catalytic amount of a mixture of equimolar quantities of $Ga_2O_3$ and $In_2O_3$ at a temperature of from 325° to 385° C. and separating the ortho-sec.-butylphenol from the reaction mixture.

References Cited

UNITED STATES PATENTS 2,542,190   2/1957   Gorin et al. _____ 260—671
2,793,239   5/1957   Toland _____ 260—624

LEON ZITVER, Primary Examiner.

W. B. LONE, Assistant Examiner.